(12) United States Patent
Gillaugh et al.

(10) Patent No.: US 12,291,973 B1
(45) Date of Patent: May 6, 2025

(54) METHOD AND SYSTEM FOR REPAIRING TURBINE AIRFOILS

(71) Applicant: Government of the United States, as Represented by the Secretary of the Air Force, Wright-Patterson AFB, OH (US)

(72) Inventors: Daniel Gillaugh, Troy, OH (US); Alexander Kaszynski, Layfayette, CO (US); Jeffrey Brown, Bellbrook, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 0 days.

(21) Appl. No.: 18/406,369

(22) Filed: Jan. 8, 2024

Related U.S. Application Data

(63) Continuation of application No. 17/958,488, filed on Oct. 3, 2022, now Pat. No. 11,905,845.

(60) Provisional application No. 63/270,071, filed on Oct. 21, 2021.

(51) Int. Cl.
| | |
|---|---|
| *F01D 5/00* | (2006.01) |
| *G01M 1/30* | (2006.01) |
| *G01M 15/14* | (2006.01) |

(52) U.S. Cl.
CPC .............. *F01D 5/005* (2013.01); *G01M 1/30* (2013.01); *G01M 15/14* (2013.01); *F05D 2230/80* (2013.01)

(58) Field of Classification Search
CPC ................................ F01D 5/005; G01M 1/30
See application file for complete search history.

(56) References Cited

U.S. PATENT DOCUMENTS

| | | | | |
|---|---|---|---|---|
| 6,049,978 | A | 4/2000 | Arnold | |
| 6,339,878 | B1 * | 1/2002 | Owen | B23P 6/005 |
| | | | | 29/889.7 |
| 6,814,543 | B2 * | 11/2004 | Barb | F01D 5/141 |
| | | | | 416/500 |
| 9,382,916 | B2 * | 7/2016 | Schoenenborn | F01D 5/34 |
| 10,293,437 | B2 | 5/2019 | Huxol et al. | |
| 11,400,550 | B2 * | 8/2022 | Shin | B23P 6/005 |
| 11,434,764 | B2 * | 9/2022 | Morris | G06F 30/23 |
| 11,905,845 | B1 * | 2/2024 | Gillaugh | G01M 5/0066 |
| 2006/0260125 | A1 | 11/2006 | Arnold et al. | |
| 2007/0251072 | A1 * | 11/2007 | Beeson | B23P 6/007 |
| | | | | 29/402.09 |

* cited by examiner

*Primary Examiner* — Jason L Vaughan
*Assistant Examiner* — Amanda Kreiling
(74) *Attorney, Agent, or Firm* — AFMCLO/JAZ; Matthew D. Fair

(57) ABSTRACT

The present disclosure is directed to a method and system for repairing a blade for a turbomachine that has been damaged due to foreign object impact. Machine learning algorithms are used to determine an amount of material to be removed from one or more damage locations and determine an amount of material addition to the damaged portion(s) and/or at other locations on the blade to keep the natural frequencies of the repaired blade within design limits during operation.

16 Claims, 2 Drawing Sheets

METHOD AND SYSTEM FOR REPAIRING TURBINE AIRFOILS

Pursuant to 37 C.F.R. § 1.78(a)(4), this application is a Continuation of currently pending Non-Provisional application Ser. No. 17/958,488 filed Oct. 3, 2022 which claims the benefit of and priority to prior filed Provisional Application Ser. No. 63/270,071, filed Oct. 21, 2021, which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to repairing airfoils for turbomachines such as gas turbine engines or fluid pumps and the like.

BACKGROUND

Turbomachinery airfoils operating at high rotational speed can be damaged during operation due to ingestion of foreign objects such as birds, rocks or other debris. Damage is typically located on the leading edge of the airfoil, however other locations are often damaged as well. It is desirable to repair blades when possible due to the expense of a replacement with new blades. Blades often are made from exotic materials such as aerospace alloys, composites, ceramics or combinations thereof.

Repairing the blade typically requires a process known as blending in an attempt to make the repaired blade as aerodynamic as the original design. Blending involves removal of material around the damaged region and then grinding, polishing or using other operations to re-contour and create a smooth shape. There are geometric limits on the blend dimensions to ensure that the repaired airfoil continues to meet material strength requirements.

One common limiter of blend dimensions are the resultant resonant natural frequencies of the repaired airfoil blade. If a critical airfoil resonant frequency changes beyond pre-defined design limits, it may coincide with an aerodynamic loading frequency, which will result in a structural resonance condition that can lead to a rapid fatigue failure. Prior art methods for blade repair and analysis are not adequate in many circumstances. Therefore, there remains a need for further contributions in this area of technology.

SUMMARY

One embodiment of the present disclosure includes a unique method for repairing damaged turbomachinery blades such as those on pumps, fans, compressors and turbines or the like. Other embodiments include apparatuses, systems, devices, hardware, methods, and combinations wherein damaged material is removed from the blade and material is added to the blade in one or more locations to ensure the critical natural frequencies of the blade are within design requirements. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
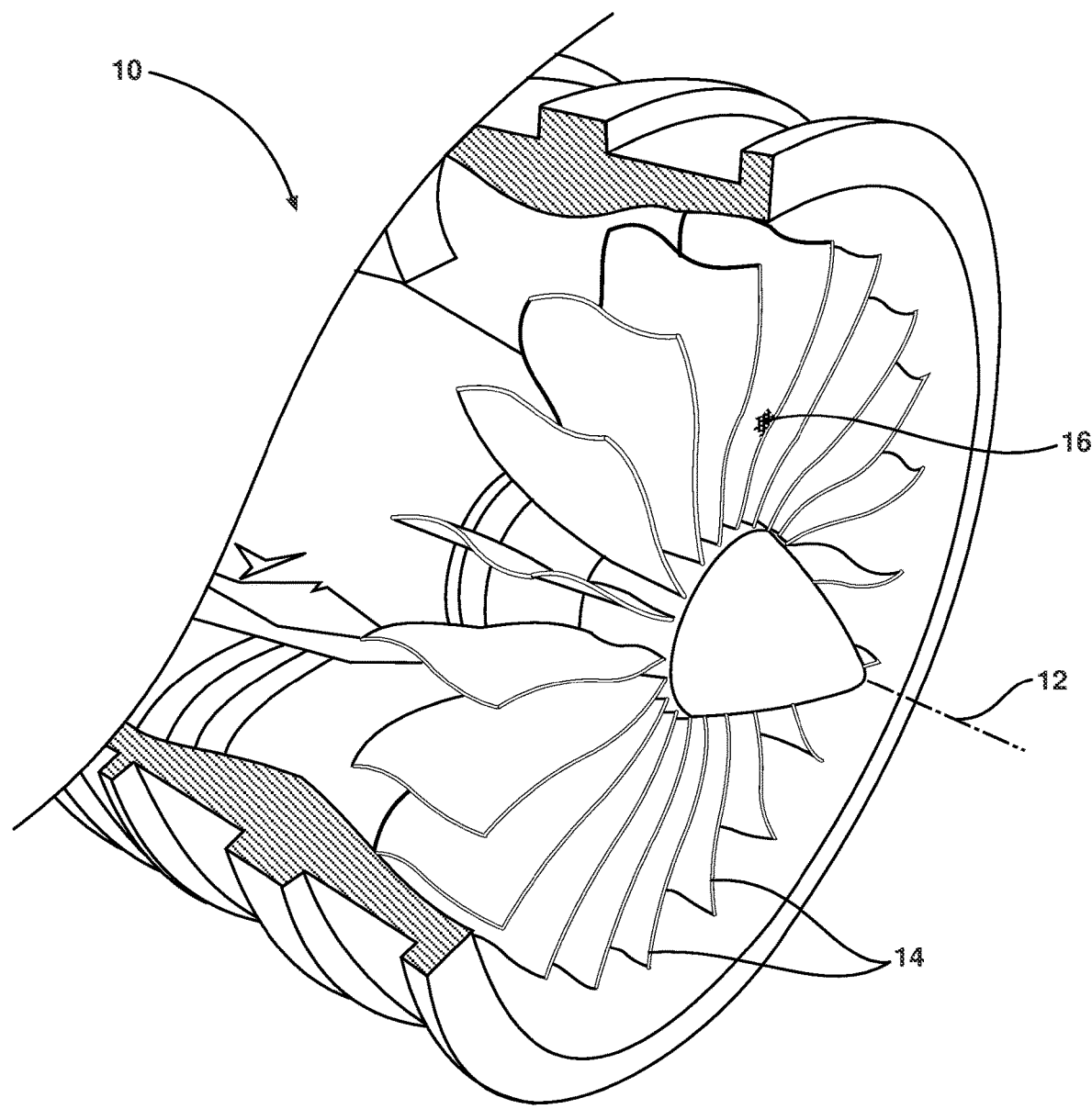
FIG. 1 is a perspective view of a portion of a representative turbomachine with a damaged blade according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure is directed to a new system and process for blend repair of an airfoil blade for a turbomachine such as a gas turbine engine, turbopump, boat propeller, wind turbine or the like. This process includes a machine learning approach that defines the effect of blend repairs on the vibratory response of the airfoil. Once the computational process of the machine learning is complete, the change of vibration frequency can be determined for all possible blend shapes and locations for material addition to the airfoil.

The compensatory blending approach is a major improvement to current practices used to define blends. The disclosed method permits an expanded range of acceptable repair limits for airfoils by increasing the size of allowable damage repair of the airfoils. The disclosed repair method ensures that the resonant frequencies of the repaired airfoils stay within design specifications. By expanding the repair limits of the airfoils a substantial sustainment cost reduction over the lifetime of the turbomachine can be achieved because the blades can repaired instead of being scrapped as required in the past.

In one form, the inventive method and system is used to determine where compensatory blends can be placed to counteract frequency changes from the primary damage site. This enables more control over vibratory frequency variation by defining an increase in allowable blend repair sizes. This repair method uses one or more computer models that represent a range of blended airfoil vibratory responses. The predictions from these models and the set of blend geometries that were used to create them are input to a machine learning model. The machine learning model is built from a combination of a general trend function and a correlated error function between the general trend and the set of machine learning data. The machine learning approach can be augmented through feeding both function values (airfoil frequencies) and gradients (eigensensitivities) into the algorithm. The approach can further be augmented by inclusion of experimental results collected in either laboratory bench condition or rotating test facilities. The experimental data would be collected in the laboratory with accelerometers or laser vibrometry equipment and the rotating data would be collected with laser tip timing measurements which can then predict the vibration response of any potential blade repair along the leading edge of the airfoil.

The machine learning model predicts the effect of a blend at a primary damage location—typically at a leading edge, but not always. If the required blend at the primary damage site causes the repaired blade to fall outside of a design frequency limit, a numerical optimization routine can be used to determine the location, size, and shape of a second blend including material removal and/or material addition at different locations that will change the natural frequency so that the blade cannot be excited into a harmful vibration mode during operation. Any number of blends including material subtraction and material addition can be used to define and control the natural frequencies of the airfoil.

In some embodiments, the method of repair may include a handheld device to remove, add or smooth material on the airfoil. In other embodiments, the method of repair may include using a blend repair bench computer operated device configured to remove, add or smooth material on the airfoil. The size and location of the damaged portion of the airfoil blade can be manually measured or computer assisted with an optical measurement system integrated with the hand held device or the blend repair bench as would be understood by one skilled in the art. The repair system will then use computational machine learning analysis to determine an acceptable blend geometry at a damaged site and required compensatory blends as needed.

The computer system is operable to analyze a plurality of blend shapes and determines the vibratory response changes that the modifications will cause. The vibratory response can be determined from computer models, experimental measurements, or a combination thereof. This information is input into a machine learning algorithm in order to teach the machine to replicate vibration response as a function of any blend location and size. A numerical optimization routine uses this machine prediction capability to determine the blend size at the primary damage site and any required compensatory blends to ensure that the changes in frequency response remain within threshold design limits. The optimization process performs a global search of the blend design space to avoid convergence on local minimums that are known to exist. A gradient-based search is utilized with the necessary sensitivity values being derived from the described machine learning model. A set of random initial optimization conditions are used to avoid local minimums. In some cases, a non-gradient based Genetic Algorithm can be used to avoid local minimums. This genetic algorithm would use the described machine learning algorithm to predict the effect of compensatory blend geometries in its search for an optimum.

In one form, the inventive process is focused on airfoil vibration frequency changes due to blending a damaged portion of the blade, as this most frequently determines blend limits. However, other structural or aerodynamic responses can be included in this machine learning and optimization approach. For example, instead of blending, a computer controlled machining operation can be used to alter the thickness of the airfoil over some or all surface regions to compensate for frequency shifts. In other applications, material addition in limited area locations to the airfoil by way of additive manufacturing techniques such as 3D printing can be used for response compensation.

Referring now to FIG. 1, a portion of an exemplary turbomachine 10 is illustrated in a perspective view. The turbomachine 10 is rotatable about an axis of rotation 12. In the depicted embodiment, the turbomachine 10 is a turbofan engine with a plurality of blades 14 operable to compress ambient air during aircraft operation. It should be understood that the repair system and method described by the present invention can be utilized with any machine having a rotating bladed rotor and is not limited by the disclosed embodiment. A damaged portion 16 is shown at the leading edge of one of the blades 14. The damaged portion 16 must repaired such that the blade still meets structural and aerodynamic requirements, otherwise it must be replaced at a considerable cost for some applications such as those for aerospace and the like.

Figure 2:
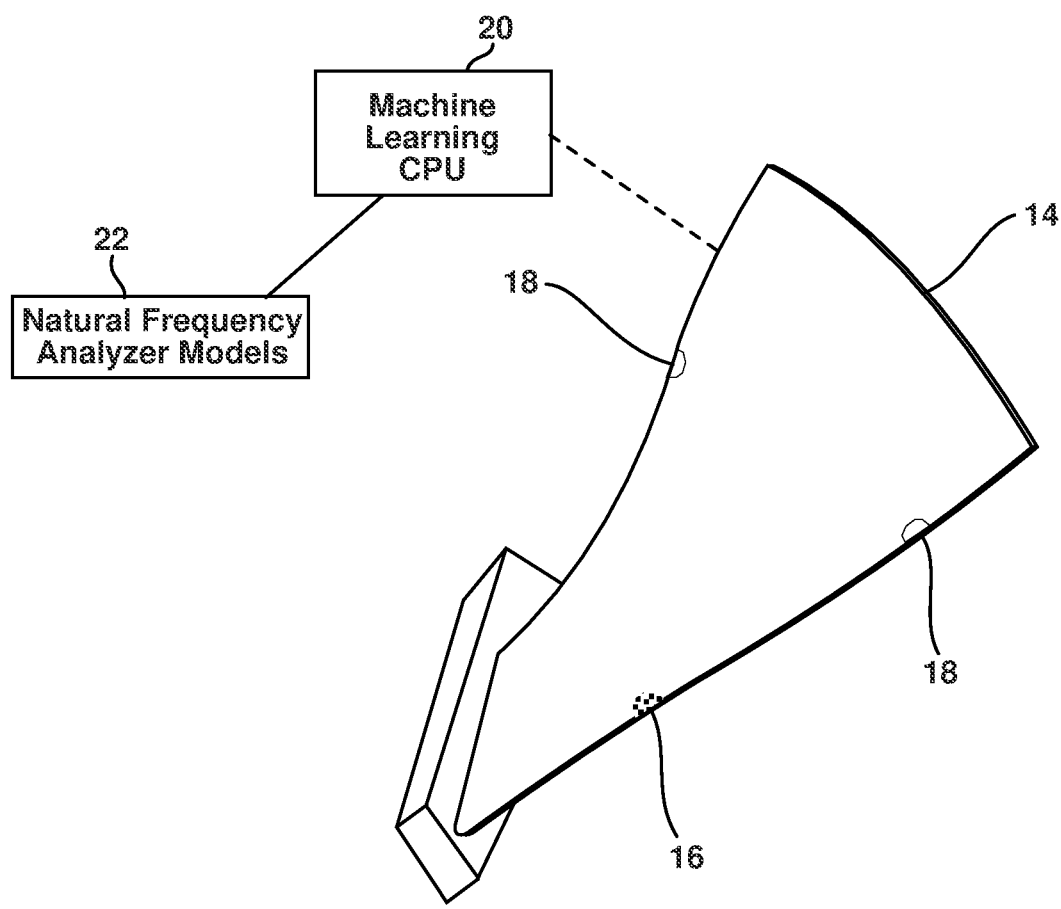
FIG. 2 is a perspective view of a representative damaged blade having material removed at the damaged location and material added at one or more locations.

Referring to FIG. 2, a blade 14 is shown wherein at least part of the damaged portion 16 has been removed by way of grinding, milling, drilling, polishing or other means known to those skilled in the art. In this example, material has been added at two locations 18 as a result of a machine learning processor 20 analyzing a plurality of possible repair techniques with natural frequency analyzer models 22 and the like. In some forms, material can be added to the damaged region 16 and in other forms the damaged region 16 can remain unmodified after polishing or smoothing after material removal. Material 18 may be added at one or more locations as will be defined by the results of the computer analysis 20. The added material 18 may be permanently attached via weld, braze, hot isostatic press (HIP) or other means known to those skilled in the art.

In one aspect, the present disclosure includes a method for repairing a blade comprising: removing a damaged portion of the blade; measuring the damaged portion of the blade; determining a natural frequency of the blade after the material has been removed; and adding material to the blade to bring the blade into compliance with natural frequency design requirements.

In refining aspects, the measuring includes a computer assisted optical measuring apparatus to measure the boundary and depth of the damaged portion; wherein the measuring includes manually measuring the boundary and depth of the damaged portion; wherein material is added at a plurality of locations on the blade; wherein material is added across a surface region of the blade to change a thickness of the blade across the region; further comprising removing material by operation of grinding, drilling, milling, waterjet, laser, electro discharge machining and/or polishing; further comprising adding material by operation of welding, laser sintering, 3D printing, and dipping; and further comprising adding and/or subtracting material from at least one other blade for statically and dynamically balancing a rotor with a plurality of blades.

In another aspect, the present disclosure includes a system for repairing a blade on a rotor comprising: a measuring device configured to measure a size of a damaged portion of a blade; a computer system operable for analyzing the blade and the damaged portion thereof; wherein the computer system includes machine learning algorithms operable to determine an amount of damaged material to remove from the blade; and wherein the computer system uses the machine learning algorithms to determine the amount of material addition and corresponding one or more locations on the blade to keep the natural frequencies of the blade within threshold design limits.

In refining aspects, the size of the damaged portion includes a defined perimeter and a defined depth thereof; wherein the measuring device is an optical device operably connected to computer system; wherein a damaged material is removed from the damaged portion of the blade and a new material is added to the damaged portion of the blade prior to blending a repaired blade profile; wherein a damaged material is removed from the damaged portion of the blade and a new material is added to a different location on the blade to change the operating frequency of the blade; and wherein the blade is used in one of a gas turbine engine, a fluid pump, a propeller or a wind turbine.

In another aspect, a method for repairing an airfoil blade comprises using a machine learning processor to analyze a damaged blade; analyzing a plurality of repair options including removal of at least one damaged portion of the blade and adding material to one or more locations of the blade; and wherein the analyzing provides an optimized the repair of the blade such that operation blade frequencies of the repaired blade are within design limits during operation.

In refining aspects, the method includes measuring the boundary and depth of the damaged portion of the blade; removing an amount of material from the damaged portion of the blade based on the results of the analysis of the machine learning processor; adding a predetermined amount of material to at least one location on the blade based on the results of the analysis of the machine learning processor; wherein material addition occurs at the damaged location and/or at other non-damaged locations of the blades; and balancing a rotor with a plurality blades by adding and/or subtracting material from at least one other non-damaged blade to statically and dynamically balance the rotor.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A method for repairing a blade comprising:
   removing a damaged portion of the blade;
   measuring the damaged portion of the blade;
   determining a natural frequency of the blade after the material has been removed;
   determining locations where compensatory blends can be placed to counteract frequency changes due to the damaged portion of the blade;
   using a computer controlled numerical optimization routine to perform a global search of a blend design space on the blade to avoid convergence on local minimums; and
   adding material to the blade in one or more locations to bring the blade into compliance with natural frequency design requirements while avoiding the local minimums.

2. The method of claim 1, wherein the measuring includes a computer assisted optical measuring apparatus to measure the boundary and depth of the damaged portion.

3. The method of claim 1, wherein the measuring includes manually measuring the boundary and depth of the damaged portion.

4. The method of claim 1, wherein material is added across a surface region of the blade to change a thickness of the blade across the region.

5. The method of claim 1, further comprising removing material by operation of grinding, drilling, milling, water jet, laser, electro discharge machining and/or polishing.

6. The method of claim 1, further comprising adding material by operation of welding, laser sintering, 3D printing, and dipping.

7. The method of claim 1, further comprising adding and/or subtracting material from at least one other blade for statically and dynamically balancing a rotor with a plurality of blades.

8. The method of claim 1, further comprising performing a gradient based search using predetermined sensitivity values by the numerical optimization routine.

9. The method of claim 1, further comprising using a set of random initial optimization conditions by the numerical optimization routine to determine and avoid the local minimums.

10. A method for repairing an airfoil blade comprising:
    using a machine learning processor to analyze a damaged blade;
    analyzing a plurality of repair options including removal of at least one damaged portion of the blade and adding material to one or more locations of the blade;
    wherein the analyzing provides an optimized repair of the blade such that operation blade frequencies of the repaired blade are within design limits during operation;
    wherein the machine learning processor uses function values (airfoil frequencies) and gradients (eigensensitivities) to determine an optimized repair procedure; and
    wherein material addition occurs at other non-damaged locations of the blades.

11. The method of claim 10, wherein analyzing includes measuring the boundary and depth of the damaged portion of the blade.

12. The method of claim 11, further comprising removing an amount of material from the damaged portion of the blade based on the results of the analysis of the machine learning processor.

13. The method of claim 10, further comprising adding a predetermined amount of material to at least one location on the blade based on the results of the analysis of the machine learning processor.

14. The method of claim 10, wherein material addition occurs at the damaged location.

15. The method of claim 10, further comprising balancing a rotor with a plurality blades by adding and/or subtracting material from at least one other non-damaged blade to statically and dynamically balance the rotor.

16. The method of claim 10, further comprising removing material at non-damaged locations of the blade to meet optimization repair requirements as determined by the machine learning processor.

* * * * *